US011002713B2

(12) United States Patent
Simpson et al.

(10) Patent No.: US 11,002,713 B2
(45) Date of Patent: May 11, 2021

(54) SAMPLE ORGANIZER, TRAY, SYSTEM AND METHOD

(71) Applicant: Waters Technologies Corporation, Milford, MA (US)

(72) Inventors: David A. Simpson, Hopkinton, MA (US); Joshua A. Burnett, Taunton, MA (US); Marc E. Lemelin, Douglas, MA (US); Paul Keenan, Harrisville, RI (US); Peter Osswald, Whitinsville, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 166 days.

(21) Appl. No.: 16/438,798

(22) Filed: Jun. 12, 2019

(65) Prior Publication Data
US 2019/0383776 A1 Dec. 19, 2019

Related U.S. Application Data

(60) Provisional application No. 62/684,866, filed on Jun. 14, 2018.

(51) Int. Cl.
  *G01N 30/16* (2006.01)
  *G01N 30/02* (2006.01)

(52) U.S. Cl.
  CPC ....... *G01N 30/16* (2013.01); *G01N 2030/027* (2013.01)

(58) Field of Classification Search
  CPC .. G01N 30/16; G01N 2030/027; G01N 30/24; G01N 30/22; G01N 30/88;
  (Continued)

(56) References Cited

U.S. PATENT DOCUMENTS

| 4,027,934 A | 6/1977 | Wiser |
| 4,678,081 A | 7/1987 | Richter |

(Continued)

FOREIGN PATENT DOCUMENTS

| EP | 0 902 271 A2 | 3/1999 |
| FR | 2788042 A1 | 7/2000 |

(Continued)

OTHER PUBLICATIONS

Application No. PCT/US2019/036698, International Search Report and the Written Opinion of the International Searching Authority, or the Declaration dated Oct. 9, 2019. 14 pages.

(Continued)

*Primary Examiner* — Robert R Raevis
(74) *Attorney, Agent, or Firm* — Schmeiser, Olsen & Watts LLP; Victor J. Baranowski

(57) ABSTRACT

A liquid chromatography sample organizer includes a first chamber, a plurality of stacked sample organizer shelves mounted within the first chamber each individually configured to store a sample-vial carrier including a sample, and a shelf magnet affixed to a surface of each of the plurality of stacked sample organizer shelves. A portion of the first chamber is configured to be located adjacent to, and open to, a sample manager configured to inject liquid chromatography samples into a chromatographic flow stream. Disclosed further is a liquid chromatography system having the sample organizer, a sample drawer, and a method of transferring samples between a sample manager and the sample organizer.

28 Claims, 14 Drawing Sheets

(58) Field of Classification Search
CPC ...... G01N 30/02; G01N 35/02; G01N 35/026;
G01N 35/04; G01N 2035/0401
USPC ....... 73/61.55, 61.56, 61.59, 864.31, 864.81,
73/864.83, 864.85; 422/63, 64, 65, 70;
436/43, 46, 47, 48
See application file for complete search history.

(56) References Cited

U.S. PATENT DOCUMENTS

| | | |
|---|---|---|
| 5,366,697 A | 11/1994 | Tomasso et al. |
| 5,483,843 A | 1/1996 | Miller et al. |
| 5,900,557 A | 5/1999 | Tanihata et al. |
| 7,329,393 B2 | 2/2008 | Backes et al. |
| 7,390,390 B2 | 6/2008 | Yamamoto et al. |
| 9,194,847 B2 | 11/2015 | Burnett et al. |
| 2005/0196320 A1 | 9/2005 | Veiner et al. |
| 2008/0172023 A1 | 7/2008 | Thompson et al. |
| 2014/0286124 A1 | 9/2014 | Donohue et al. |

FOREIGN PATENT DOCUMENTS

| | | | |
|---|---|---|---|
| GB | 999621 | * | 7/1965 |
| KR | 20-0442123 Y1 | | 10/2008 |
| WO | 2011085342 A1 | | 7/2011 |

OTHER PUBLICATIONS

International Preliminary Report on Patentability in PCT/US2019/036698 dated Dec. 24, 2020.

* cited by examiner

SAMPLE ORGANIZER, TRAY, SYSTEM AND METHOD

RELATED APPLICATIONS

This application is a non-provisional patent application claiming priority to U.S. Provisional Patent Application No. 62/684,866, filed Jun. 14, 2018, entitled "Sample Organizer, Tray, System and Method," which is incorporated herein by reference.

FIELD OF THE INVENTION

The invention relates generally to liquid chromatography systems. More particularly, the invention relates to liquid chromatography sample organizers and a removable transfer drawer, and associated systems and methods.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. In an isocratic chromatography system, the composition of the liquid solvents remains unchanged, whereas in a gradient chromatography system, the solvent composition varies over time. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Prior to being provided into the liquid chromatography system, the sample may be provided to a sample organizer and/or a sample manager. The sample organizer and/or a sample manager may be configured to store the sample in conditions that prevent the sample from degrading or becoming otherwise damaged. The sample organizer and/or sample manager may be configured to provide the sample into the liquid chromatography system. The sample organizer and/or sample manager may be configured to store a plurality of samples prior to analysis by the liquid chromatography system. Movement of a sample between storage and processing and/or introduction into the liquid chromatography application may be necessary. This movement of the sample into and out of storage may need to be accomplished in a precise, repeatable and/or automatic way.

Thus, a sample organizer, tray, system and method for moving a sample, would be well received in the art.

SUMMARY

In one embodiment, a liquid chromatography system comprises: a sample organizer configured to store a plurality of sample-vial carriers each holding a sample, the sample organizer having a first chamber and a sample organizer shelf mounted within the first chamber, wherein a shelf magnet is affixed to a surface of the sample organizer shelf; a sample manager configured to inject a first sample from a first sample vial carrier of the plurality of sample-vial carriers into a chromatographic flow stream, the sample manager having a second chamber, the sample manager having a sample tray mounted within the second chamber; and a transfer drawer including a support surface configured to support the first sample-vial carrier, the transfer drawer including a first transfer drawer magnet, the transfer drawer configured to be removably coupled to the sample tray of the sample manager, the transfer drawer configured to be removably coupled to the sample organizer shelf such that attraction between the first transfer drawer magnet and the shelf magnet retain the transfer drawer in a first removably coupled position with respect to the sample organizer shelf, the transfer drawer configured to be transferred between the sample organizer shelf and the sample tray of the sample manager.

Additionally or alternatively, the transfer drawer includes a first edge and a second edge, wherein the transfer drawer includes a first tongue extending along the first edge of the transfer drawer and a second tongue extending along the second edge of the transfer drawer.

Additionally or alternatively, the sample organizer shelf includes a compartment sized to closely receive the transfer drawer, and wherein the compartment includes a first groove on a first side of the compartment configured to slidably receive the first tongue, and a second groove on a second side of the compartment configured to slidably receive the second tongue.

Additionally or alternatively, the liquid chromatography system further comprises a transfer track operably coupled to the sample manager and configured to facilitate transfer of the transfer drawer between the sample organizer shelf and the sample tray of the sample manager.

Additionally or alternatively, the sample organizer includes a plurality of sample organizer shelves mounted within the first chamber, wherein the plurality of sample organizer shelves are movable to selectively align the plurality of sample organizer shelves with the transfer track.

Additionally or alternatively, the transfer track includes a first groove on a first side of the transfer track configured to slidably receive the first tongue, wherein the transfer track includes a second groove on a second side of the transfer track configured to slidably receive the second tongue.

Additionally or alternatively, the transfer drawer includes a second transfer drawer magnet and wherein the sample tray includes a sample tray magnet, wherein attraction between the second transfer drawer magnet and the sample tray magnet retain the transfer drawer in a second removably coupled position with respect to the sample tray.

Additionally or alternatively, the transfer drawer includes a top side and a bottom side, wherein the first and second transfer drawer magnets are on the bottom side.

Additionally or alternatively, the first transfer drawer magnet is located proximate a first side of the transfer drawer and wherein the second transfer drawer magnet is located proximate a second side of the transfer drawer, the second side opposite the first side.

Additionally or alternatively, the liquid chromatography system further includes a transfer mechanism including a pin configured to engage the transfer drawer during the transferring of the transfer drawer between the sample tray and the sample organizer shelf.

Additionally or alternatively, the sample organizer shelf is configured to move away from the pin within the first chamber of the sample organizer in order to disengage from the pin from the transfer drawer after the transferring.

Additionally or alternatively, the transfer drawer includes a pin slot configured to receive the pin and couple the transfer mechanism to the transfer drawer during the transferring of the transfer drawer between the sample tray and the sample organizer shelf.

In another embodiment, a liquid chromatography sample organizer comprises: a first chamber; a plurality of stacked sample organizer shelves mounted within the first chamber, the plurality of stacked sample organizer shelves each individually configured to store a sample-vial carrier including a sample; and a shelf magnet affixed to a surface of each of the plurality of stacked sample organizer shelves, wherein a portion of the first chamber is configured to be located adjacent to, and open to, a sample manager configured to inject liquid chromatography samples into a chromatographic flow stream.

Additionally or alternatively, the liquid chromatography sample organizer further comprises a transfer drawer including a support surface configured to support the sample-vial carrier, the transfer drawer including a first transfer drawer magnet, the transfer drawer configured to be removably coupled to the sample organizer shelf such that attraction between the first transfer drawer magnet and the shelf magnet retain the transfer drawer in a first removably coupled position with respect to the sample organizer shelf, the transfer drawer configured to be transferred between the sample organizer shelf and the sample tray of the sample manager.

Additionally or alternatively, the transfer drawer includes a first edge and a second edge, wherein the transfer drawer includes a first tongue extending along the first edge of the transfer drawer and a second tongue extending along the second edge of the transfer drawer.

Additionally or alternatively, each of the plurality of stacked sample organizer shelves includes a compartment sized to closely receive the transfer drawer, and wherein the compartment includes a first groove on a first side of the compartment configured to slidably receive the first tongue, and a second groove on a second side of the compartment configured to slidably receive the second tongue.

Additionally or alternatively, the plurality of stacked sample organizer shelves are movable to selectively align a selected shelf of the plurality of stacked sample organizer shelves with a transfer mechanism of the sample manager.

Additionally or alternatively, the transfer drawer includes a top side and a bottom side, wherein the first transfer drawer magnet is on the bottom side.

Additionally or alternatively, the liquid chromatography sample organizer further comprises a transfer mechanism including a pin configured to engage the transfer drawer during the transferring of the transfer drawer between the sample manager and a selected one of the plurality of stacked sample organizer shelves.

Additionally or alternatively, the sample organizer shelf is configured to move away from the pin within the first chamber of the sample organizer in order to disengage from the pin from the transfer drawer after the transferring.

Additionally or alternatively, the transfer drawer includes a pin slot configured to receive the pin and couple the transfer mechanism to the transfer drawer during the transferring of the transfer drawer between the sample manager and the selected one of the plurality of stacked sample organizer shelves.

In another embodiment, a transfer drawer for use in a liquid chromatography system comprises: a support surface configured to support a sample-vial carrier; a first transfer drawer magnet; and a second transfer drawer magnet, wherein the transfer drawer is configured to be removably coupled to a sample organizer shelf such that the first transfer drawer magnet is configured to retain the transfer drawer in a first removably coupled position with respect to the sample organizer shelf, the transfer drawer configured to be transferred between the sample organizer shelf and a sample tray of a sample manager, and wherein the transfer drawer is configured to be removably coupled to the sample tray of the sample manager such that the second transfer drawer magnet is configured to retain the transfer drawer in a second removably coupled position with respect to the sample tray.

Additionally or alternatively, the transfer drawer includes a first edge and a second edge, wherein the transfer drawer includes a first tongue extending along the first edge of the transfer drawer and a second tongue extending along the second edge of the transfer drawer.

Additionally or alternatively, the support surface includes a compartment defined between the first edge and the second edge configured to securably receive the sample-vial carrier.

Additionally or alternatively, the transfer drawer includes a top side and a bottom side, wherein the first and second transfer drawer magnets are on the bottom side.

Additionally or alternatively, the first transfer drawer magnet is located proximate a first side of the transfer drawer and wherein the second transfer drawer magnet is located proximate a second side of the transfer drawer, the second side opposite the first side.

Additionally or alternatively, the transfer drawer includes a pin slot configured to receive a pin of a transfer mechanism, the pin and the transfer mechanism configured to transfer the transfer drawer between the sample organizer shelf and a sample tray of a sample manager.

In another embodiment, a method of transferring samples in a liquid chromatography system comprises: providing a sample organizer having a first chamber and a sample organizer shelf mounted within the first chamber, the sample shelf including a shelf magnet; providing a sample manager having a second chamber, the sample manager having a sample tray mounted within the second chamber; providing a transfer drawer including a support surface and a first transfer drawer magnet; storing a plurality of sample vial carriers in the sample organizer; supporting a first sample-vial carrier of the plurality of sample vial carriers on the support surface of the transfer drawer, the first sample-vial carrier including a first sample; removably coupling the transfer drawer to the sample tray of the sample manager; injecting, with the sample manager, the liquid chromatography sample into a chromatographic flow stream; transferring the transfer drawer from the sample tray to the sample organizer shelf; and removably coupling, after the transferring, the transfer drawer to the sample organizer shelf such that attraction between the first transfer drawer magnet and the shelf magnet retain the transfer drawer in a first removably coupled position with respect to the sample organizer shelf.

Additionally or alternatively, the transfer drawer includes a first edge and a second edge, wherein the transfer drawer includes a first tongue extending along the first edge of the transfer drawer and a second tongue extending along the second edge of the transfer drawer, wherein the sample organizer shelf includes a compartment sized to closely receive the transfer drawer, and wherein the compartment includes a first groove on a first side of the compartment, and a second groove on a second side of the compartment, wherein the removably coupling the transfer drawer to the sample organizer shelf further comprises: slidably receiving the first tongue with the first groove; and slidably receiving the second tongue with the second groove.

Additionally or alternatively, the method of transferring samples in a liquid chromatography system further comprises: providing a transfer track operably coupled to the sample manager; and facilitating transfer of the transfer drawer between the sample organizer shelf and the sample tray of the sample manager with the transfer track.

Additionally or alternatively, the method of transferring samples in a liquid chromatography system further comprises: providing a plurality of sample organizer shelves mounted within the first chamber; moving the plurality of the sample organizer shelves; and selectively aligning one of the plurality of sample organizer shelves with the transfer track.

Additionally or alternatively, the transfer track includes a first groove on a first side and a second groove on a second side of the transfer track, wherein the facilitating transfer of the transfer drawer between the sample organizer shelf and the sample tray of the sample manager with the transfer track further comprises: slidably receiving the first tongue within the first groove; and slidably receiving the second tongue within the second groove.

Additionally or alternatively, the transfer drawer includes a second transfer drawer magnet and wherein the sample tray includes a sample tray magnet, wherein the removable coupling the transfer drawer to the sample tray of the sample manager is facilitated by the magnetic attraction between the second transfer drawer magnet and the sample tray magnet.

Additionally or alternatively, the transfer drawer includes a top side and a bottom side, wherein the first and second transfer drawer magnets are on the bottom side.

Additionally or alternatively, the first transfer drawer magnet is located proximate a first side of the transfer drawer and wherein the second transfer drawer magnet is located proximate a second side of the transfer drawer, the second side opposite the first side.

Additionally or alternatively, the method of transferring samples in a liquid chromatography system further comprises providing a transfer mechanism including a pin, wherein the transferring the transfer drawer from the sample tray to the sample organizer shelf further comprises engaging the transfer drawer with the pin.

Additionally or alternatively, the method of transferring samples in a liquid chromatography system further comprises moving the sample organizer shelf away from the pin within the first chamber of the sample organizer; and disengaging the transfer drawer from the pin from the transfer drawer with the moving.

Additionally or alternatively, the transfer drawer includes a pin slot, wherein the transferring the transfer drawer from the sample tray to the sample organizer shelf further comprises receiving and coupling the pin of the transfer mechanism to the transfer drawer.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As described herein, prior to performing a liquid chromatography run, a technician loads an array of vials containing samples onto a sample-vial carrier, places the sample-vial carrier onto a drawer, and slides the drawer into its compartment. The drawer is a removable "transfer drawer" that employs magnets to allow for removable attachment within compartments found in both a sample organizer and a sample manager. When the magnets of the drawer are close in proximity to magnets in a sample organizer compartment or a sample manager compartment, the magnets pull the drawer against the compartment with a tactile snapping sensation, thereby providing a positive confirmation to the technician that the drawer has been fully closed within the compartment. The sample organizer may include a plurality of compartments or shelves for storing transfer drawers in an environment that prevents or reduces degradation of the samples before the samples are needed by the sample manager for performing a liquid chromatography run.

Figure 1:
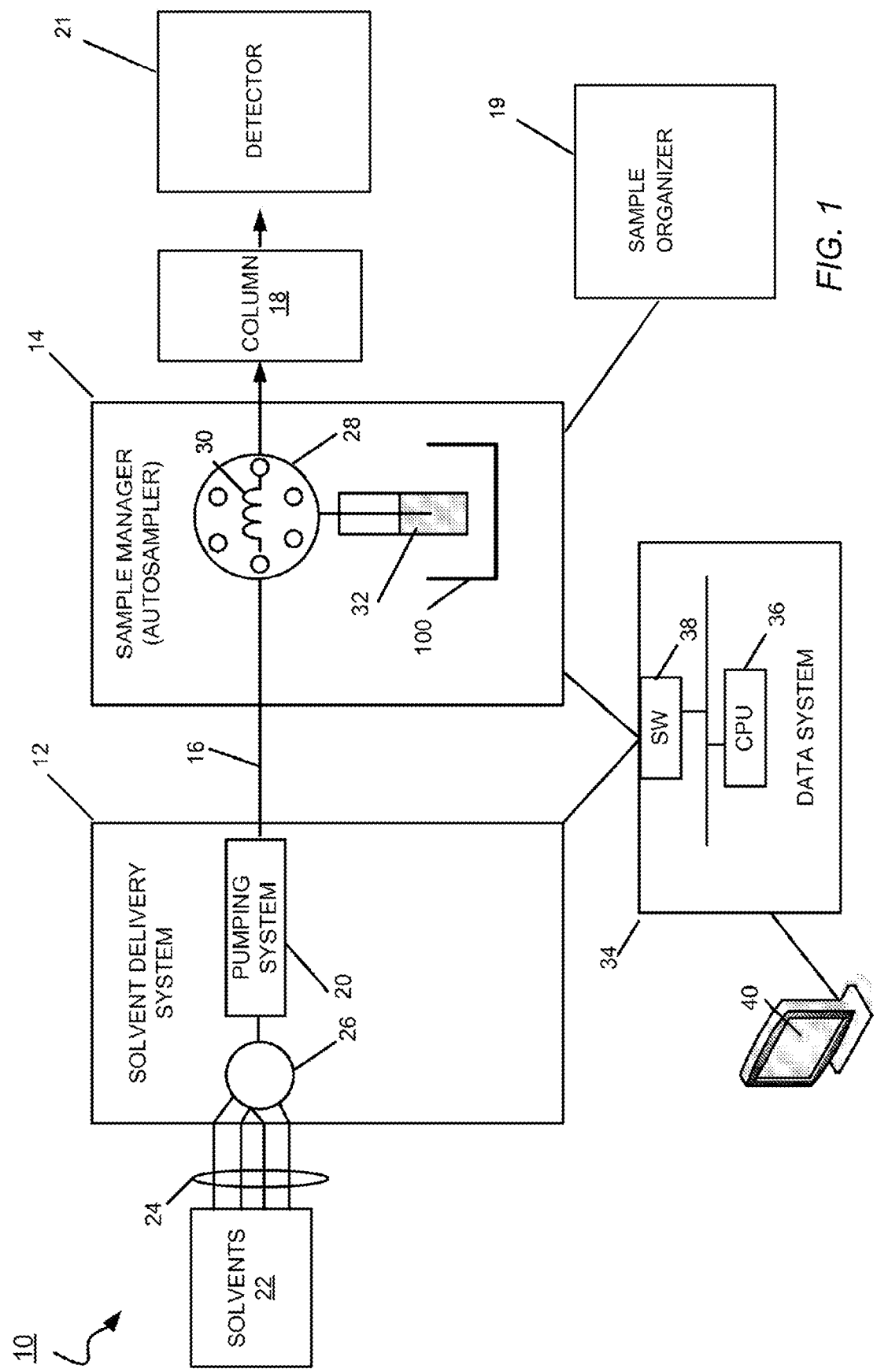
FIG. 1 depicts a schematic view of a liquid chromatography system including a sample manager and a sample organizer in accordance with one embodiment.

FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical communication with a sample organizer 19. The sample organizer 19 may be configured to store samples and provide stored samples to the sample manager 14 using an automated, robotic, or other mechanical moving process. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 operates in one of two states: a load state and an injection state. In the load state, the position of the injector valve 28 is such that the sample manager loads the sample 32 into the sample loop 30. The sample 32 is drawn from a vial contained by a sample vial carrier. "Sample vial carrier" herein means any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 further includes a data system 34 that is in signal communication with the solvent delivery system 12 and the sample manager 14. The data system 34 has a processor 36 and a switch 38 (e.g. an Ethernet switch) for handling signal communication between the solvent delivery system 12 and sample manager 14, as described herein. Signal communication among the various systems and instruments can be electrical or optical, using wireless or wired transmission. A host computing system 40 is in communication with the data system 34 by which a technician can download various parameters and profiles (e.g., an intake velocity profile) to the data system 34.

Figure 2:
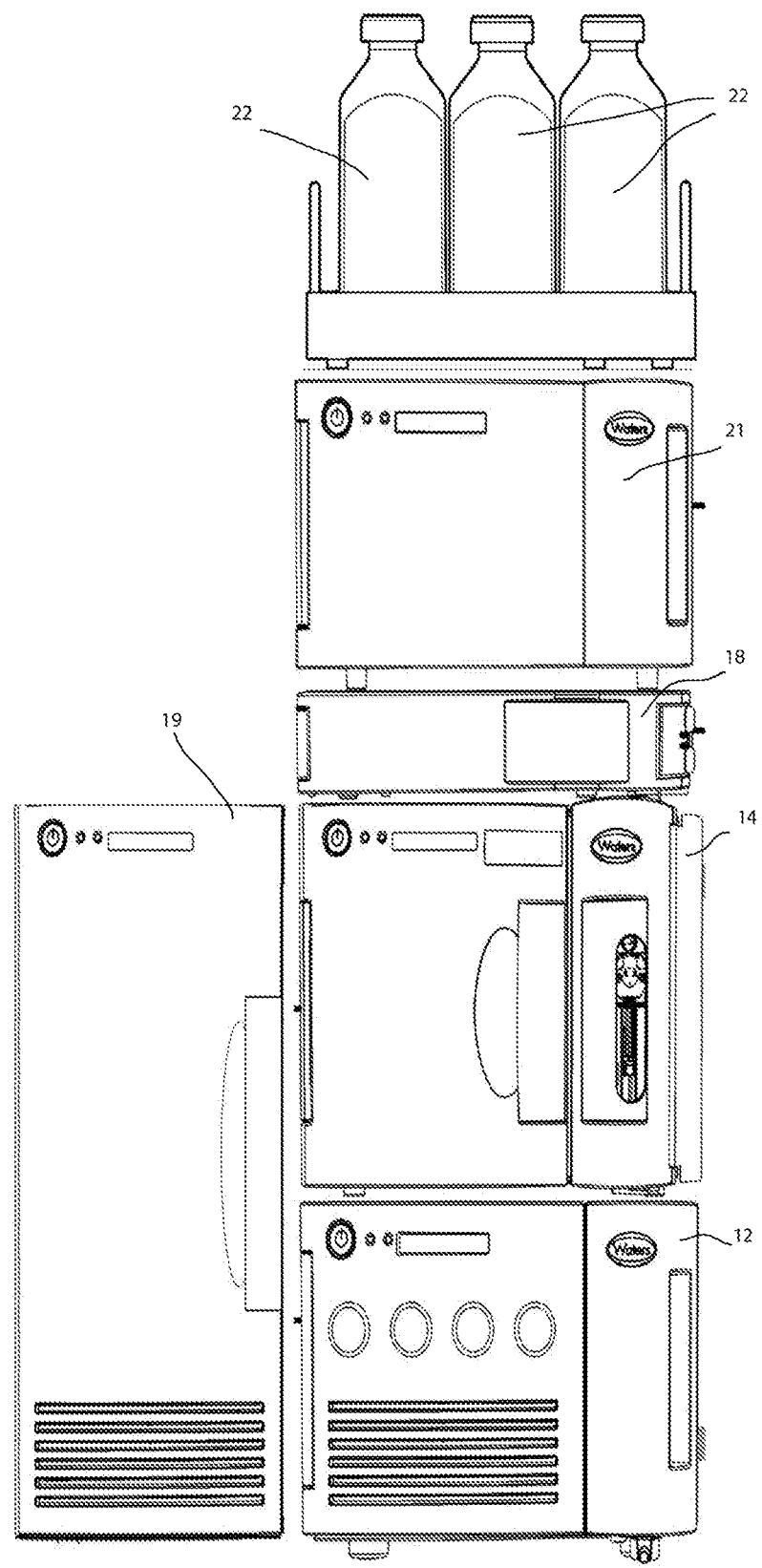
FIG. 2 depicts a perspective view of a liquid chromatography system including the sample manager and the sample organizer of FIG. 1 in accordance with one embodiment.

FIG. 2 shows a perspective view of the liquid chromatography system 10 including the sample manager 14, the sample organizer 19, the detector 21, the chromatographic column 18, the solvent delivery system 12, and the solvents 22. Each of the sample manager 14, the sample organizer 19, the detector 21, the chromatographic column 18, the solvent delivery system 12 may include a housing or body within which the various features may be housed, such as the data system 34, the sample loop 30 and injector valve 28, the pumping system 20, the mixer 26 and the tubing 24. The various components 12, 14, 18, 19, 21, 22 may be interconnected with fluidic tubes and in signal communication to the data system 34 of the system. The liquid chromatography system 10 is shown with the solvent delivery system 12, sample manager 14, chromatographic column 18, detector 21 and a tray for holding the solvents 22 stacked together and positioned adjacent, proximate or next to the sample organizer 19. The sample manager 14 and the sample organizer 19 may be connected to each other via an opening in each of the sample manager 14 and an opening in the sample organizer 19, described herein below.

The sample organizer 19 includes a hinged door and includes an inner storage chamber or thermal chamber which may include a plurality of sample organizer shelves disposed or movably mounted within the inner storage chamber. The plurality of shelves may be located at a front of the sample organizer 19 proximate the hinged door. A space may be located in the back of the chamber to facilitate transportation of samples or sample-vial carriers vertically within the chamber to and from the shelves. Thus, the plurality of sample organizer shelves may be movable to selectively align the plurality of sample organizer shelves within the sample manager 14 and a transfer system 100 (shown in FIGS. 4, and 8-14) configured to transfer samples between the sample manager 14 and the sample organizer 19. The sample organizer 19 may include one or more air filters at the top and/or bottom of the unit. Further, the sample organizer 19 may include a plurality of LED's to indicate various states including the state of each of the plurality of shelves and the overall state of the sample organizer 19 (power, run, etc). The sample organizer 19 may be configured to keep inner storage chamber in a temperature and/or pressure regulated state.

Figure 3:
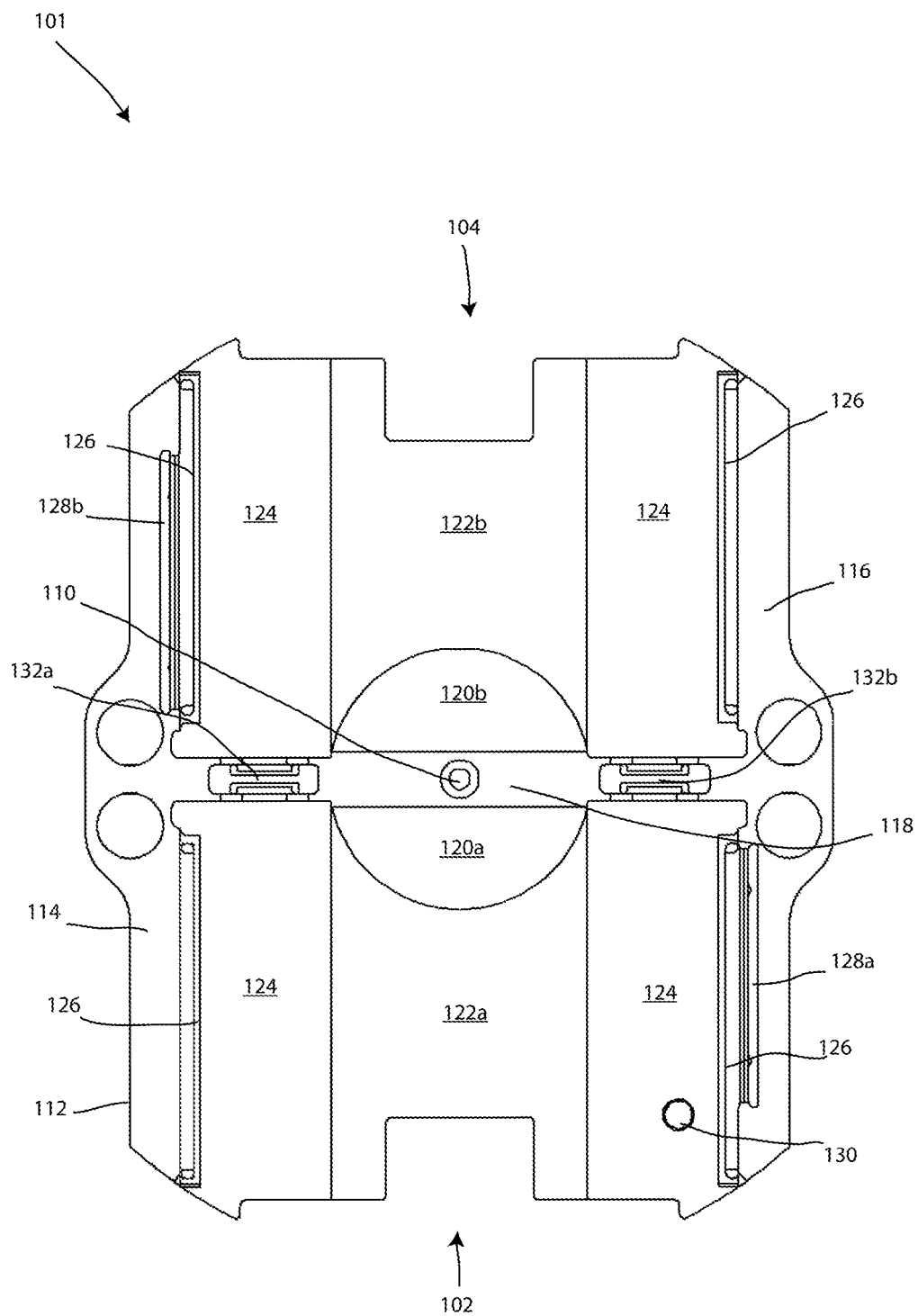
FIG. 3 depicts a top view of the sample tray of the sample manager of FIGS. 2 and 4 in accordance with one embodiment.

As shown in FIG. 3, a top view of a sample tray 101 of the sample manager 14, shown in accordance with one embodiment. The sample tray 101 is shown including two tray locations, a first location 102 and a second location 104. The two tray locations 102, 104 may be symmetrically inserted, like the two halves of a playing card. Each compartment may hold one of the transfer drawers 150. In one embodiment, the first and second locations 102, 104 are each also about 3.5" wide by 5" deep to accommodate the transfer drawers 150. The locations 102, 104 and the transfer drawers 150 may be designed to support sample-vial plates or carriers of different dimensions without departing from the principles of the invention. The locations 102, 104 may be compartments, slots, carriages, chambers, cells, or the like.

The sample tray includes a base 112. The base 112 includes a first side walls 114, a second side wall 116 opposing the first side wall 114, and a cross wall 118 bisecting each of the opposing side walls 114, 116. The side walls 114, 116 and the cross wall 118 may be of a uniform height and, when viewed from above, together form the capital letter H, with the cross wall 118 dividing the sample tray 101 into the two tray locations 102, 104.

Midway in the cross wall 118 is a circular opening 110 for receiving a bolt or a post by which to secure the sample tray 101 to a rotary drive mechanism disposed below the sample chamber. On each of the opposite sides of the cross wall 108 is a semicircular platform 120a, 120b. The semicircular platforms 120a, 120b rise above sunken surfaces 122a, 122b of the base 112. The two semicircular platforms 120a, 120b are opposite halves of a circular platform bisected by the cross wall. This circular platform and the circular opening 110 in the cross wall are concentric.

Along each side wall 114, 116 on both sides of the cross wall 118 is a side platform 124 raised above the plane of the depressed or sunken surfaces 122a, 122b. Each side wall 114, 116 has a groove 126. Each side wall 114, 116 further includes a leaf spring opening 128a, 128b, respectively that are catty-cornered across the sample tray 101.

The sample tray 101 includes one calibration hole 130, which is located in one of the side platforms 124. The calibration hole 130 is an exception to the inverted symmetry between the tray locations 102, 104, there being only one such hole for the sample tray 101. In this embodiment, the calibration hole 130 is in the first location 102 of the sample tray 101 and penetrates entirely through the side platform 124 with a hole in the datum plate. A metallic or plastic pin is insertable through the calibration hole and datum plate hole. During calibration, an encoder detects this pin and uses it to establish a home (i.e. reference) position from which all other tray positions are known. The pin may be removed after calibration.

Within the cross wall 118 of the sample tray 101 may be affixed a first tray magnet 132a and a second tray magnet 132b. More than two magnets are contemplated as shown. In other embodiments, a single magnet with an opening aligned to the circular opening 110 may extend across the entirety of the cross wall 118. While the magnets 132a, 132b are shown on a top or upper surface of the sample tray 101, in other embodiments, the magnets 132a, 132b on the sample tray 101 may be located on an underside or bottom surface of the sample tray 101 such that the magnetic effects of the magnets 132a, 132b may extend through the body of the sample tray 101, as described in U.S. Pat. No. 9,184,847, which is hereby incorporated by reference. Whatever the embodiment, the magnets 132a, 132b located on the sample tray 101 may be configured to magnetically attract to corresponding magnets found in the sample drawers 150, and retain the transfer drawer 150 in a removably coupled position with respect to the transfer tray 101 as described herein below.

Figure 4:
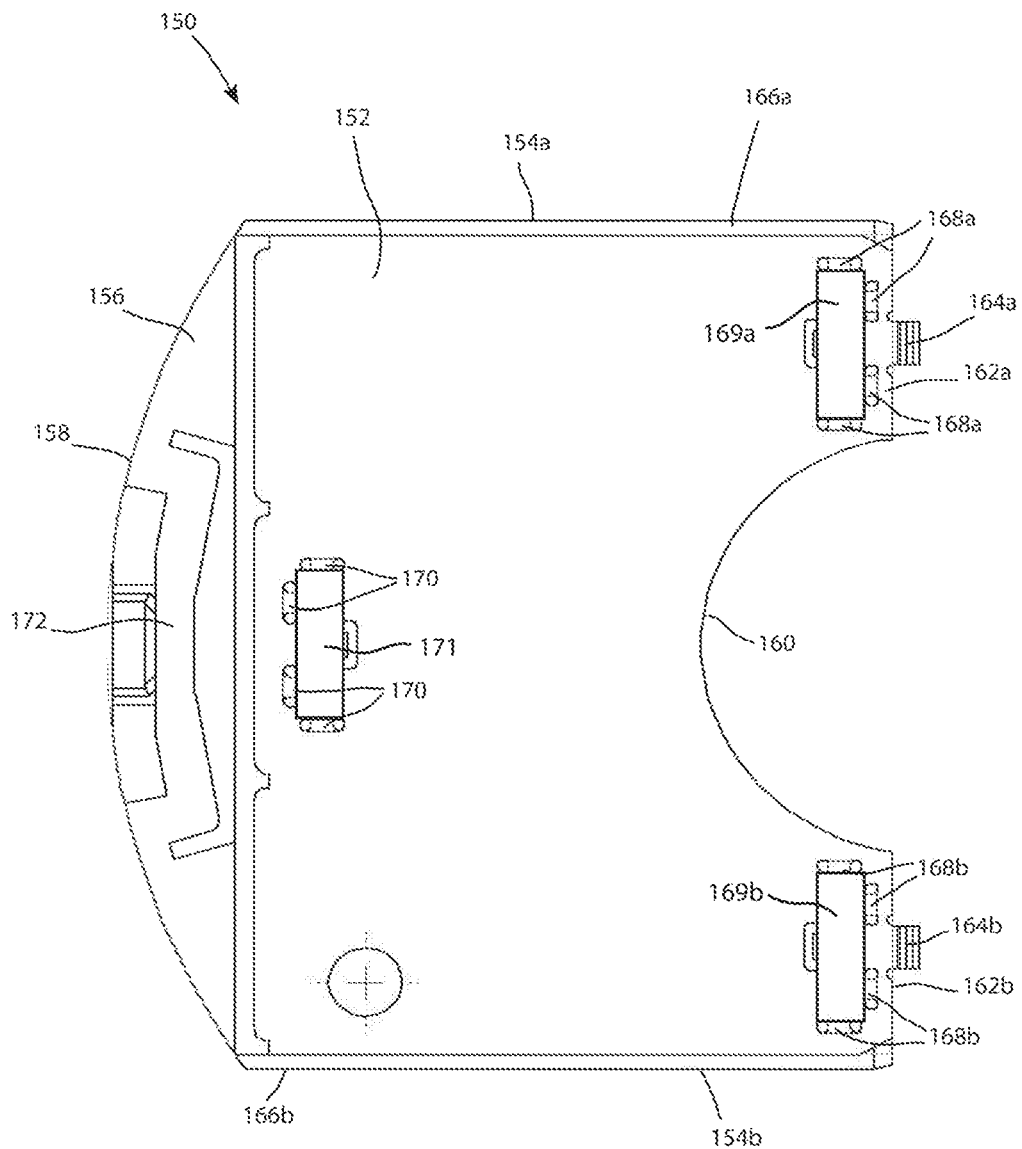
FIG. 4 depicts a top view of the transfer drawer of FIG. 4 in accordance with one embodiment.

FIG. 4 depicts a top view of the transfer drawer 150 in accordance with one embodiment. The transfer drawer 150 may be a rectangular sample vial carrier that is 3.5" wide by 5" deep. The transfer drawer 150 has a planar surface 152 with opposing side edges 154a, 154b, a handle 156 at a front edge 158, and an arcuate rear edge 160 that forms prongs 162a, 162b. Extending from each of the prongs 162a, 162b is a post 164a, 164b, respectively. The posts 164a, 164b may serve as positional guides or locators for directing a sample-vial carrier onto the planar surface 152 of the transfer drawer 150. Each side edge 154a, 154b may further include a side tongue 166a, 166b extending along a length that edge. The side tongues 166a, 166b enter the grooves 126 of the sample tray 101. As the transfer drawer 150 slides into one of the first or second location 102, 104, the side tongues 142 of the transfer drawer 150 slide through the grooves 126 in the side platforms 124.

The transfer drawer 150 includes a first plurality of rear magnet holders 168a located in the first prong 162a holding a first rear magnet 169a. The transfer drawer 150 includes a second plurality of rear magnet holders 168b located in the second prong 162b holding a second rear magnet 169b. The plurality of rear magnet holders 168a, 168b may be configured to hold, retain, or secure the first and second rear magnets 169a, 169b to the transfer drawer 150. In other embodiments, the first and second plurality of rear magnets 169a, 169b may be affixed or otherwise attached, fashioned, stuck or glued to the prongs 162a, 162b. When the transfer drawer 150 is inserted into one of the locations 102, 104 of the sample tray 101, the first and second rear magnets 169a, 169b may be aligned with, and magnetically attracted to, the first and second tray magnets 132a, 132b, respectively, as described in more detail herein below. The first and second rear magnets 169a, 169b may each be a single magnet, or may each be a plurality of magnets in other embodiments. The first and second rear magnets 169a, 169b may be any number of magnets configured to provide the desired level of magnetic attraction to the first and second tray magnets 132a, 132b. While the first and second rear magnets 169a, 169b are shown located on the upper surface or top of the transfer drawer 150, in other embodiments, the first and second rear magnets 169a, 169b may be affixed to the underside or bottom surface of the transfer drawer 150.

The transfer drawer 150 further includes a front plurality of magnet holders 170 located proximate the handle 156 on the planar surface 152 holding a front magnet 171. Thus, in embodiments contemplated, the front magnet 171 may be located on an opposite side of the transfer drawer 150 than the first and second rear magnets 169a, 169b. When the transfer drawer 150 is inserted into a sample organizer shelf 200 (described herein below and shown in FIG. 5), the front magnet 171 may be aligned with, and magnetically attracted to, one or more magnets of the sample organizer shelf 200, as described in more detail herein below. Thus, the front magnet 171, in conjunction with the magnets of the sample organizer shelf 200, may be configured to retain the transfer drawer 150 in a removably coupled position with respect to the sample organizer shelf 200. The front magnet 171 may be a single magnet as shown, or a plurality of magnets in other embodiments. The front magnet 171 may be any number of magnets configured to provide the desired level of magnetic attraction to the magnets of the sample organizer shelf 200. While the front magnet 171 is shown located on the upper or top surface of the transfer drawer 150, in other embodiments, the front magnet 171 may be affixed to the underside or bottom surface of the transfer drawer 150.

The transfer drawer 150 further includes a pin slot 172. The pin slot 172 may be a slot located in the handle 156. The pin slot 172 may be configured to receive a pin 302 from the transfer mechanism 300 of the transfer system 100, as described herein below and shown in FIGS. 9-12. Thus, the pin slot 172 may be configured to couple the transfer mechanism 300 to the transfer drawer 150 during transferring of the transfer drawer 150 between the sample tray 101 of the sample manager 14 and the sample organizer shelf 200 of the sample organizer 19. The pin slot 172 may be a recess, channel, sunken surface or the like. The pin slot 172 may extend along a length of the handle 156. In alternative embodiments, the pin slot 172 may be a circular slot configured to receive a pin having a circular cross section. Whatever the embodiment, the pin slot 172 may be configured to receive a transfer mechanism 300 that facilitates movement of the transfer drawer 150 between the sample manager 14 and the sample organizer 19 and particular between the sample tray 101 and the sample organizer shelves 200.

Figure 5:
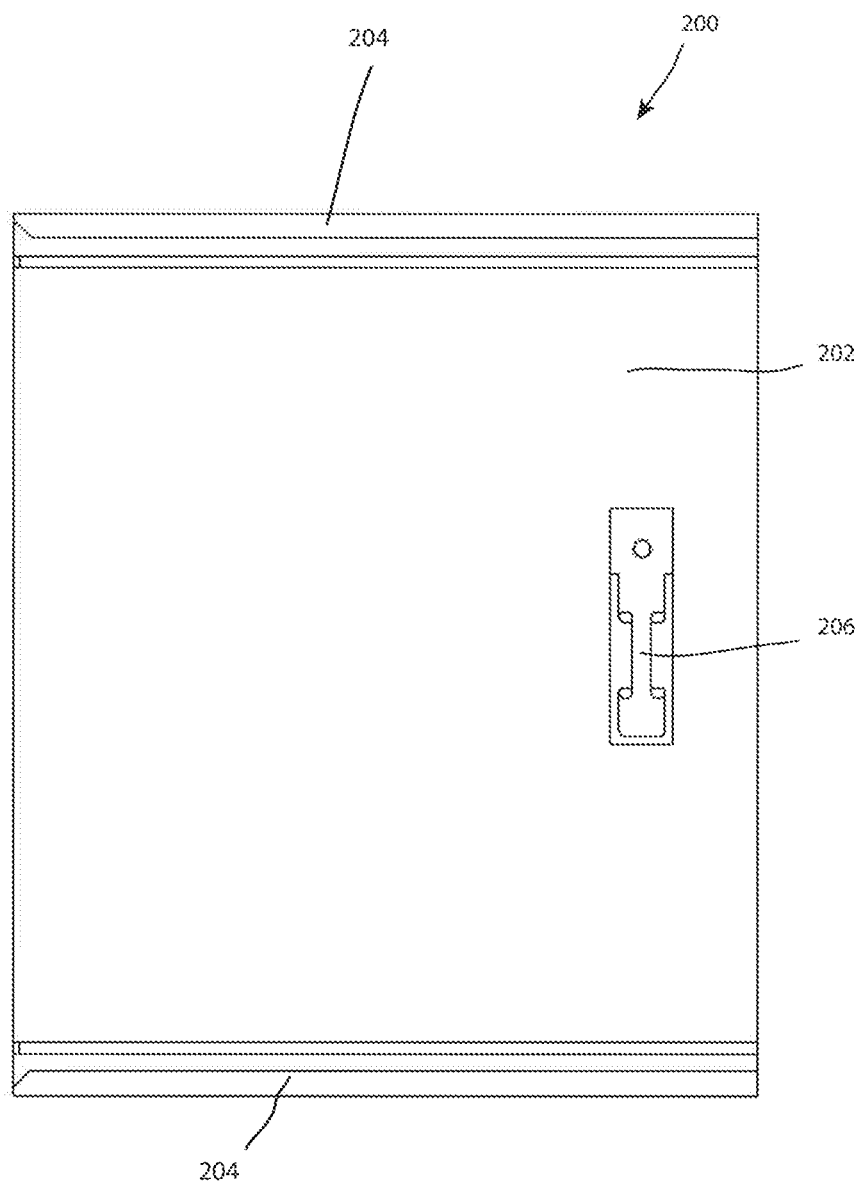
FIG. 5 depicts a top view of a sample organizer shelf of the sample organizer of FIGS. 2-4 in accordance with one embodiment.
Figure 7:
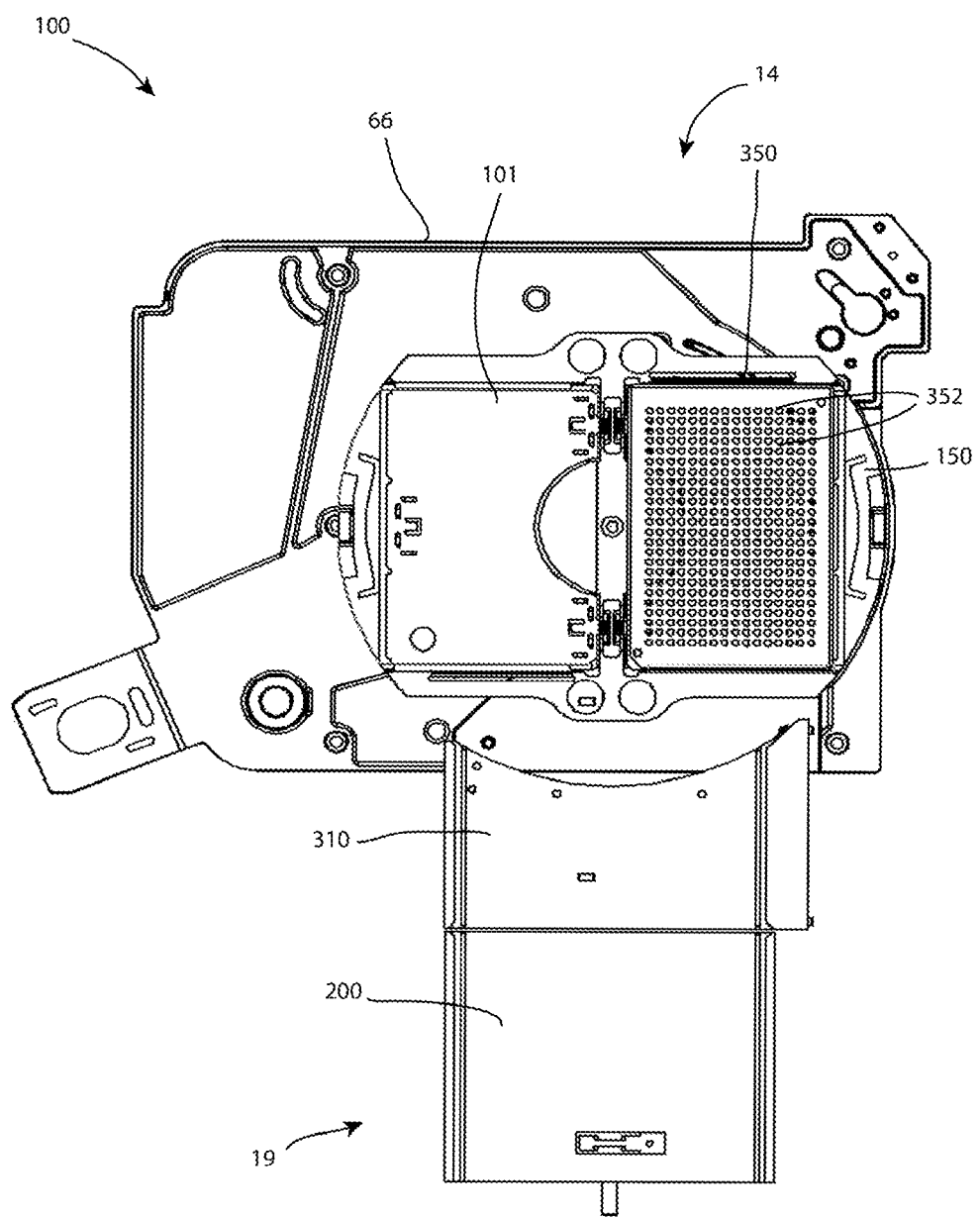
FIG. 7 depicts a top view of the transfer system of FIG. 6 with the transfer drawer contracted into the sample tray in accordance with one embodiment.

FIG. 5 depicts one of the sample organizer shelves 200 in accordance with one embodiment. While one sample organizer shelf 200 is shown, in FIGS. 7-14, the sample organizer 19 may include a number of the sample organizer shelves 200. As shown in FIG. 7, the sample organizer shelf 200 includes a rectangular shaped planar support surface 202. The rectangular planar support surface may be considered a storage location, compartment, or the like. The dimensions of the sample organizer shelf 200 may correspond to the dimensions of the transfer drawer 150 and may be at least 3.5" wide and at least 5" deep such that the compartment or support surface is sized to closely receive the transfer drawer 150. The sample organizer shelves 200 may include grooves 204 proximate each side. The grooves 204 may be configured to slidably receive the side tongues 166a, 166b of the transfer drawer 150.

The sample organizer shelf 200 may further include a magnet 206 affixed or otherwise attached, fashioned, stuck or glued to the planar support surface 202 of the sample organizer shelf 200. The magnet 206 may be configured to become magnetically attracted to the plurality of front magnets 170 of the transfer drawer 150 when the transfer drawer 150 is fully inserted into the sample organizer shelf 200. While the magnet 206 is shown located on the upper or top surface of the sample organizer shelf 200, in other embodiments, the magnet 206 may be affixed to the underside or bottom surface of the sample organizer shelf 200. Further, while the embodiment shown includes the one magnet 206, other embodiments may include a plurality of magnets. Whatever the embodiment, the 206 may be configured to magnetically attract to the front magnets 170 of the transfer drawer 150, as described herein below, and provide the desired level of magnetic attraction to the front magnets 170 of the sample drawer 150.

Figure 6:
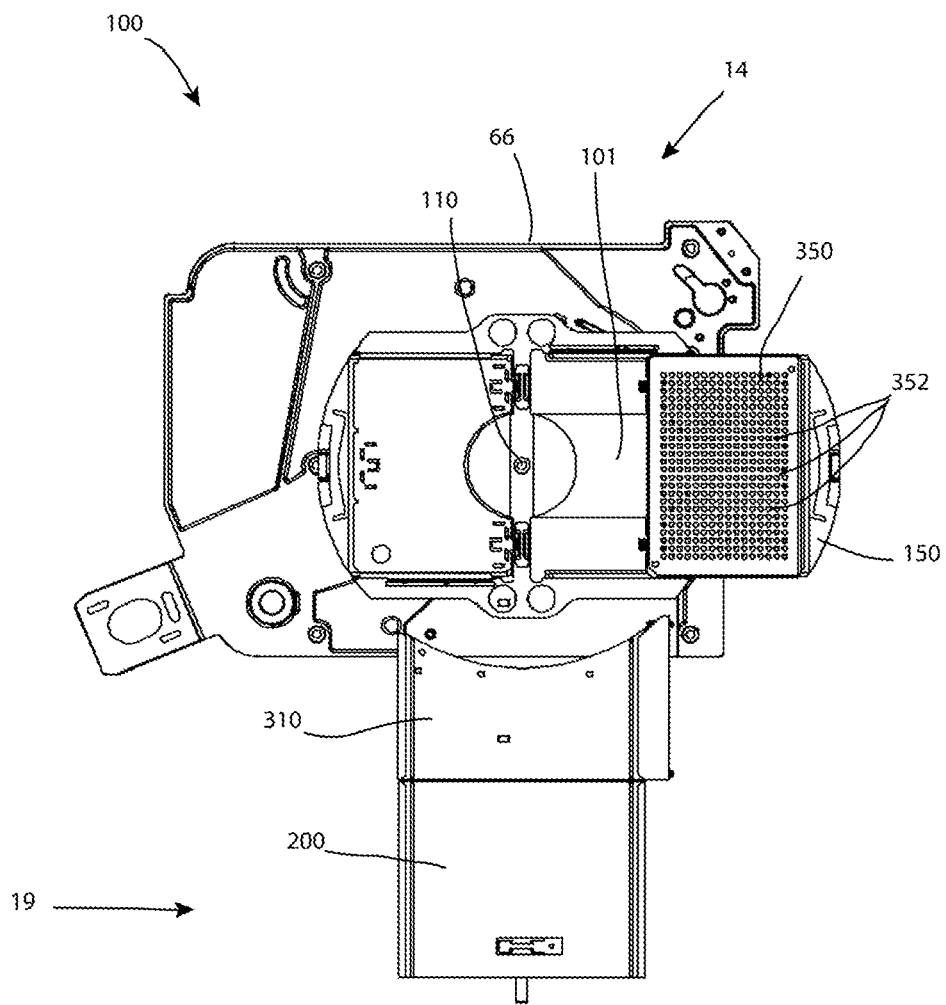
FIG. 6 depicts a top view of a transfer system of the sample manager and sample organizer of FIGS. 1-2 with the transfer drawer of FIG. 4 extending from the sample tray of FIG. 5 in accordance with one embodiment.

FIG. 6 depicts a top view of a first step of a transfer system 100 and method for transferring samples between the sample manager 14 and the sample organizer 19. The system 100 includes a transfer drawer 150 extending from the sample tray 101 in accordance with one embodiment. The sample tray 101 is shown resting on the instrument base 66 in a manner such that the sample tray 101 is rotatable with respect to the instrument base 66 about the circular opening 110. The transfer drawer 150 is shown with a sample plate 350 disposed thereon. The sample plate may include a plurality of sample vials 352 arranged in a grid or other pattern. This first step of the transfer system 100 includes loading a transfer drawer 150 into the sample tray 101 of the sample manager 14. While not shown, a user may open a door of the sample manager 14 to access the thermal chamber of the sample manager 14. The user may then begin to slide the tongues 166a, 166b of the sample tray 150 into the grooves 126 of the first location 102 of the sample tray 101

FIG. 7 depicts a top view of the transfer system 100 with the transfer drawer 150 contracted into the sample tray 101 in accordance with one embodiment. This may be considered a second step in the transfer process. At this point, the user has fully slid the transfer drawer 150 into the sample tray 101. With the transfer drawer 150 in its location 102 the planar support surface 202 of the transfer drawer 150 fits closely between the pair of opposing side platforms 124 of the sample tray 101. While hidden under the sample plate 350, the arcuate rear edge 160 of the transfer drawer 150 closely abuts the semicircular platform 120a of the first location 102. The planar support surface 202 of the transfer drawer 150, the semicircular platform 120a of the first location 102, and side platforms 124 may be approximately of uniform height to provide a planar surface upon which to hold level the sample plate 350. Leaf springs extending from the leaf spring openings 128a of the first location 102 may be configured to bias the sample plate 350 sitting within the transfer drawer 150 toward the first side wall 114 on the opposite side.

As the transfer drawer 150 is slid into the sample tray 101 and approaches the contracted position shown in FIG. 7, the rear magnets 168a, 168b of the transfer drawer 150 may come into range of the magnetic pull of the first and second tray magnets 132a, 132b of the sample tray 101. The magnets 132a, 132b of the sample tray 101 may be oriented to attract the magnets 168a, 168b of the transfer drawer 150 and vice versa. The magnetic attraction may snap the drawer within and against its compartments 120, giving the user or technician a tactile sensation that the drawer is fully closed. When the transfer drawer 150 is fully contracted as shown in FIG. 7, the magnets 132a, 132b of the sample tray 101 and the magnets 168a, 168b of the transfer drawer 150 may abut each other.

Figure 8:
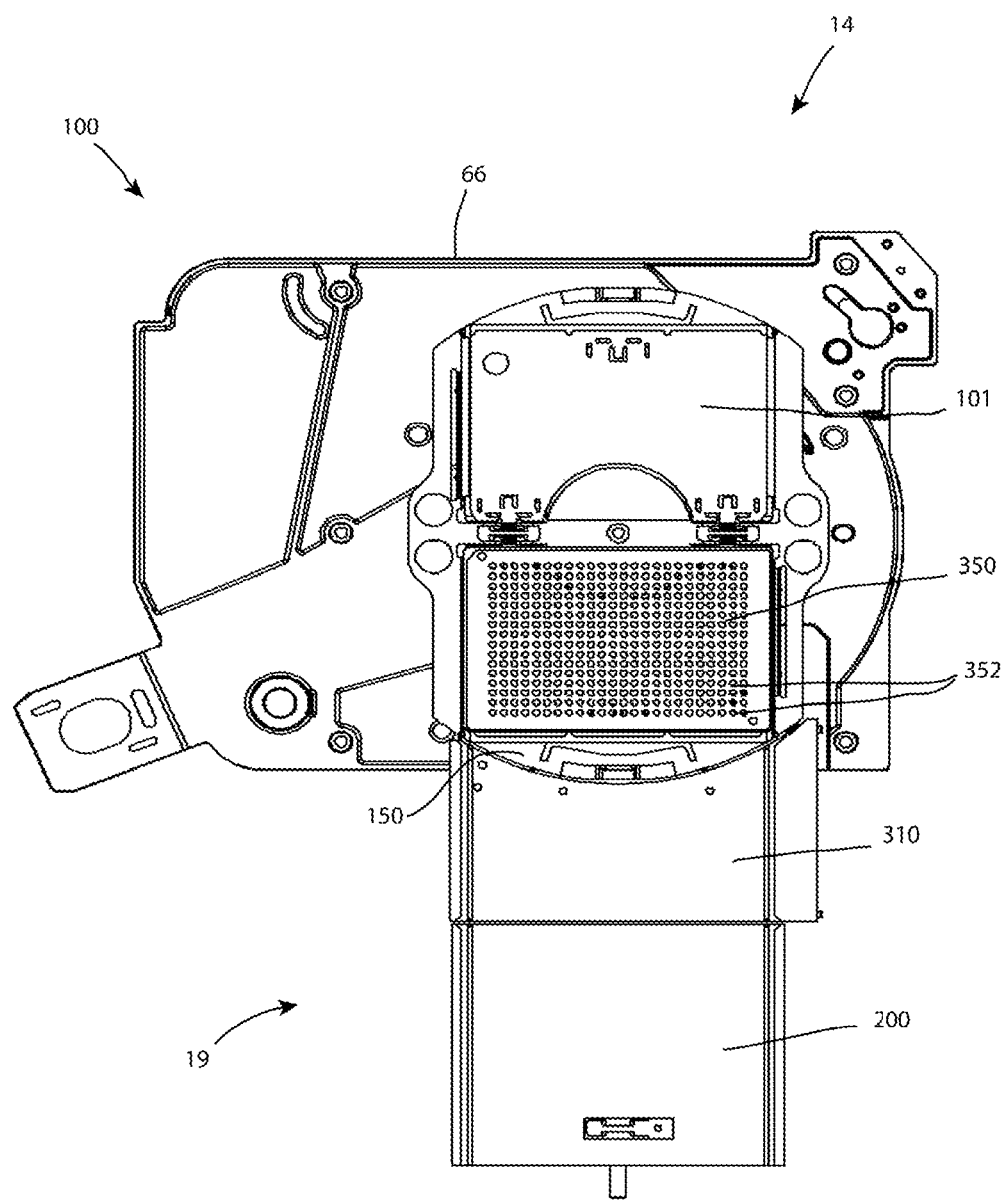
FIG. 8 depicts a top view of the transfer system of FIG. 7 with the transfer tray rotated toward the sample organizer in accordance with one embodiment.

FIG. 8 depicts a top view of the transfer system of FIG. 7 with the sample tray 101 rotated toward a sample organizer shelf 200 in accordance with one embodiment. This may considered a third step in the transfer process. As shown, the sample tray 101 may be rotatable about an instrument base 66 attached to the base of the thermal chamber of the sample manager 14. The sample tray 64 may be rotatable about the circular opening 110. This rotation may be configured to move the first location 102 of the sample tray 101 from a loading position facing the door of the sample manager 14, to a transfer position for transferring the transfer drawer 150 between the sample organizer 19 and the sample manager 14.

To accomplish the transfer, the transfer track 310 is shown disposed between the transfer drawer 150 located in the sample tray 101 and the sample organizer shelf 200. The transfer track 310 may be operably coupled to the sample tray 101 when the first location 102 is in the transfer position. The transfer track 310 may include an arcuate edge 312 that corresponds to the arcuate front edge 158 of the transfer drawer 150 in this transfer position. This arcuate edge 312 may allow for the transfer drawer 150 to rotate in an immediately adjacent position relative to the transfer track 310.

The sample tray 101 may be attached, supported or connected to the instrument base 66 such that it rotation of the sample tray 101 into the orientation shown places the transfer track 310 immediately abutting or adjacent to the transfer drawer 150. The transfer track may be attached to one or both of structure found within the sample manager 14 and the sample organizer 19.

The transfer track 310 may be an interface module or the like configured to facilitate transfer of the transfer drawer 150 between the sample tray 101 of the sample manager 14 and the sample organizer shelf 200 of the sample organizer 19 and vice versa. The transfer track 310 may include a first groove 314 on a first side 316 of the transfer track 310 configured to slidably receive the first tongue 166a of the transfer drawer 150. Likewise, the transfer track 310 may include a second groove 318 on a second side 320 of the transfer track 310 configured to slidably receive the second tongue 166b of the transfer drawer 150. The transfer track 310 may not include any magnetic components, but may simply provide a track or interface mechanism to facilitate transferring of the transfer drawer 150.

Figure 9:
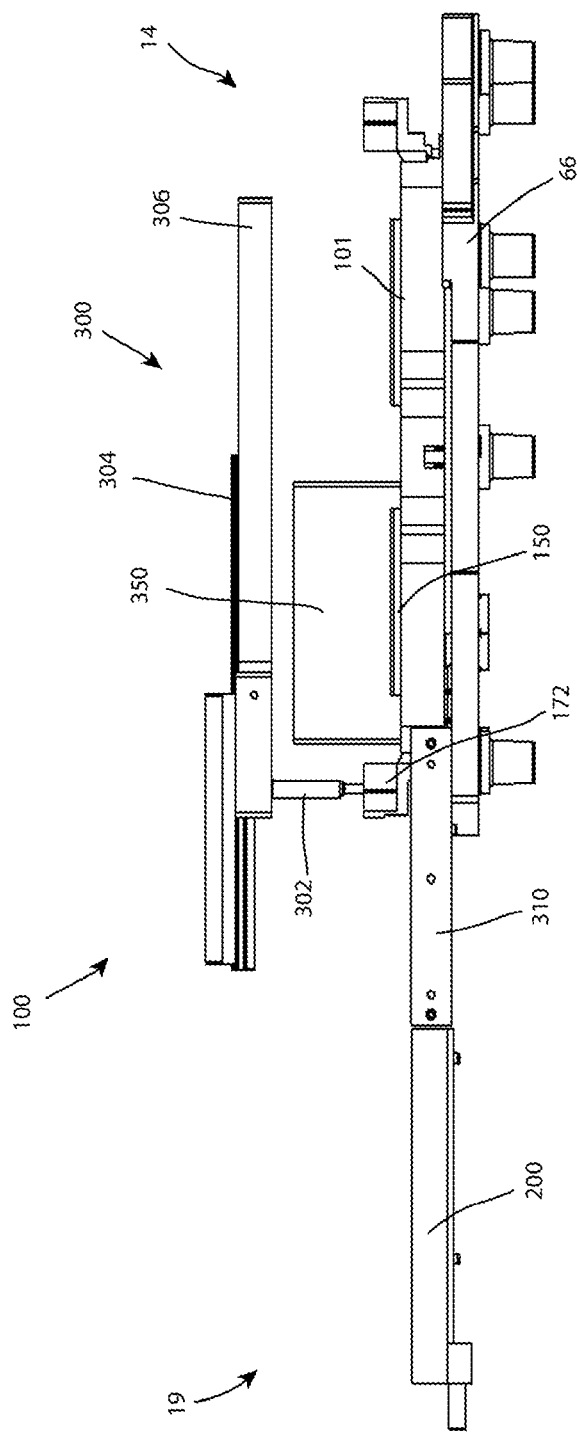
FIG. 9 depicts a side view of the transfer system of FIG. 8 including a transfer mechanism in accordance with one embodiment.

FIG. 9 depicts a side view of the transfer system 100 of FIG. 8 including the transfer mechanism 300 in accordance with one embodiment. The transfer mechanism 300 includes the pin 302, a track 304 and a transfer mechanism body 306. The base of the transfer mechanism may be attached to either or both of the thermal chamber of the sample organizer 19 or the thermal chamber of the sample manager 14. However the transfer mechanism 300 is installed in the system, the transfer mechanism body 306 may be movable between the thermal chamber of the sample organizer 19 and the thermal chamber of the sample manager 14.

In the embodiment shown, rotation of the sample tray 101 may automatically engage the pin 302 of the transfer mechanism 300. The pin 302 may be, for example, telescopic and may be configured to extend vertically into the pin slot 172 of the transfer drawer 150. In other embodiments, the pin slot 172 may be an elongated slot that extends horizontally in the handle 156 and allows the pin 302 to engage without requiring the pin 302 to be moved vertically. Whatever the embodiment, once the sample tray 101 is rotated into a transfer position as shown, the transfer mechanism 300 may engage with the pin slot 172. In still other embodiments, the pin slot 172 may not be located in the transfer drawer 150 but instead may be located in the sample plate 350. In this embodiment, the sample plate 350 may include an extending portion configured to be located over the handle 156 of the transfer drawer 150 that includes a pin slot that is configured to be engaged with the pin 302.

Figure 10:
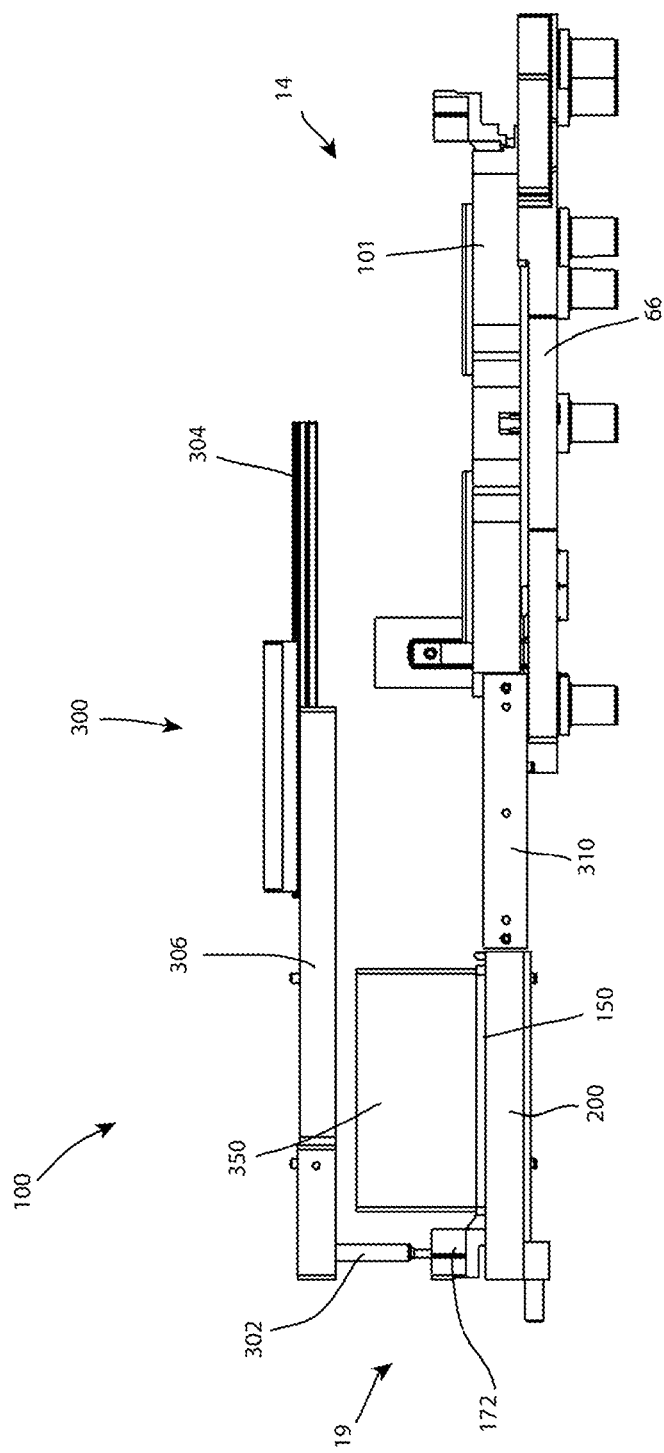
FIG. 10 depicts a side view of the transfer mechanism of FIG. 9 with a transfer mechanism moved toward the sample organizer shelf in accordance with one embodiment.

FIG. 10 depicts a side view of the transfer mechanism 300 of FIG. 9 with a transfer mechanism 300 moved toward the sample organizer shelf 200 in accordance with one embodiment. As shown, the transfer mechanism body 306 may be movable along the track 304 of the transfer mechanism 300. Movement may be accomplished with a motor in the transfer mechanism 300. Wheels or bearings may be utilized to facilitate movement of the transfer mechanism body 306 along the track 304. In other embodiments, movement may be facilitated through a permanent magnet linear motor having magnetic coils. With the pin 302 engaged with the pin slot 172, the transfer mechanism 300 moves across the transfer track 310 and into the sample organizer shelf 200 of the sample organizer 19.

As the transfer drawer 150 is slid into the sample organizer shelf 200 and approaches the position shown in FIG. 10, the front magnet 170 of the transfer drawer 150 may come into range of the magnetic pull of the magnet 206 of the sample organizer shelf 200. The magnet 206 of the sample organizer shelf 200 may be oriented to attract the front magnet 170 of the transfer drawer 150 and vice versa. The magnetic attraction may snap the drawer within and the support surface 202 of the sample organizer shelf 200. When the transfer drawer 150 is fully in position, the magnet 206 of the sample organizer shelf and the front magnet 170 of the transfer drawer 150 may abut each other. This magnetic attraction may be releasable by the force of the pin 302 of the transfer mechanism 300 when the transfer drawer 150 needs to be removed from the sample organizer shelf 200.

Figure 11:
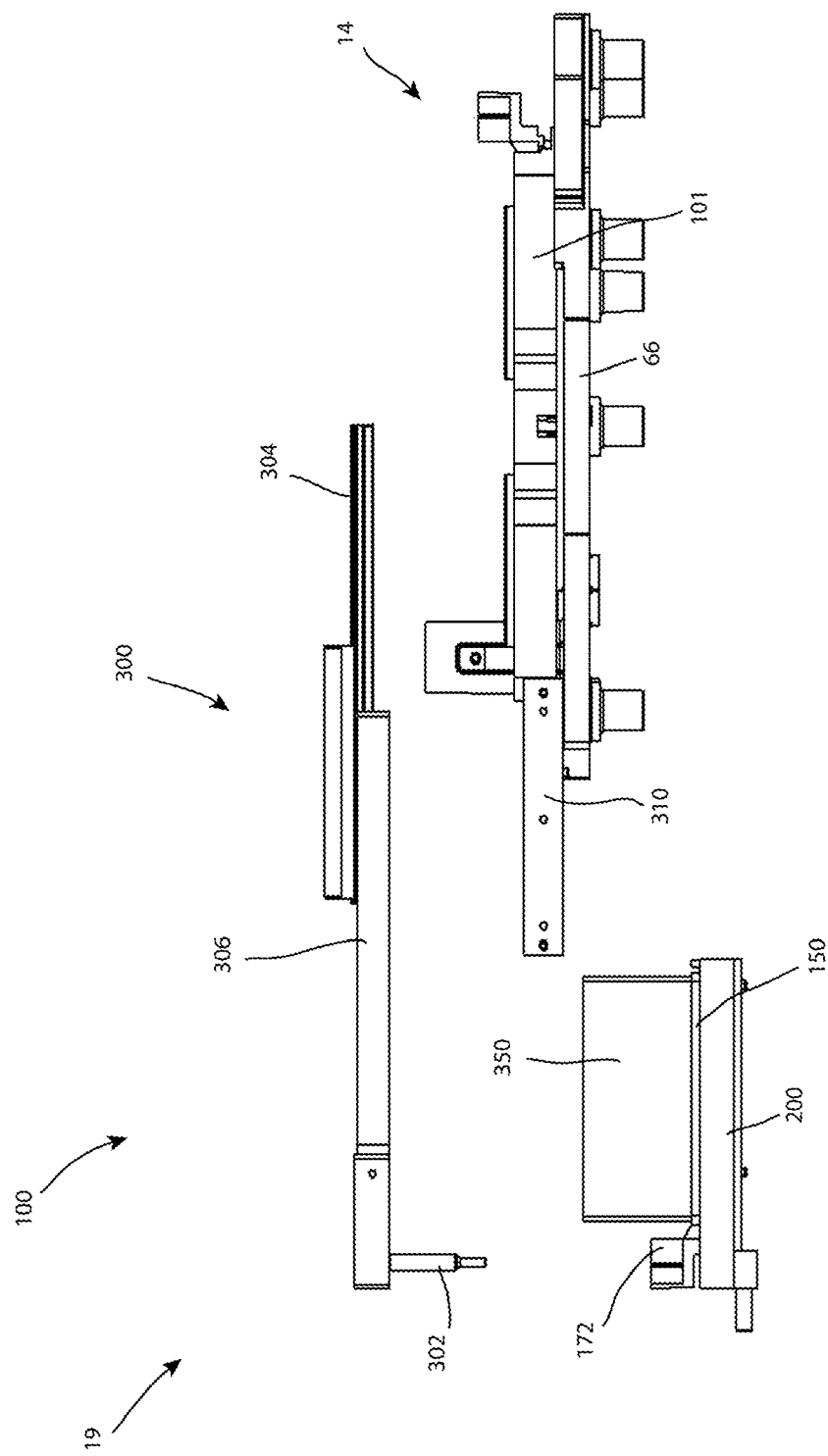
FIG. 11 depicts a side view of the transfer mechanism of FIG. 10 with the transfer mechanism disengaged from the sample organizer shelf in accordance with one embodiment.

FIG. 11 depicts a side view of the transfer mechanism 300 of FIG. 10 with the transfer mechanism 300 disengaged from the sample organizer shelf 200 in accordance with one embodiment. Disengaging the sample organizer shelf 200 may include moving the sample organizer shelf 200 downward within the thermal chamber of the sample organizer 19. While the embodiment shown does not include any vertical movement of the transfer mechanism 300, but only vertical movement of the sample organizer shelf 200 for disengagement, in other embodiments, the transfer mechanism 300 may move vertically in addition to the sample organizer shelf 200. Whatever the embodiment, the sample organizer shelf 200 may disengage from the pin 302 of the transfer mechanism 300. Now, the transfer drawer 150 and sample plate 350 is fully installed in the sample organizer 19 and can be retrieved at a later time by the sample manager 14.

Figure 12:
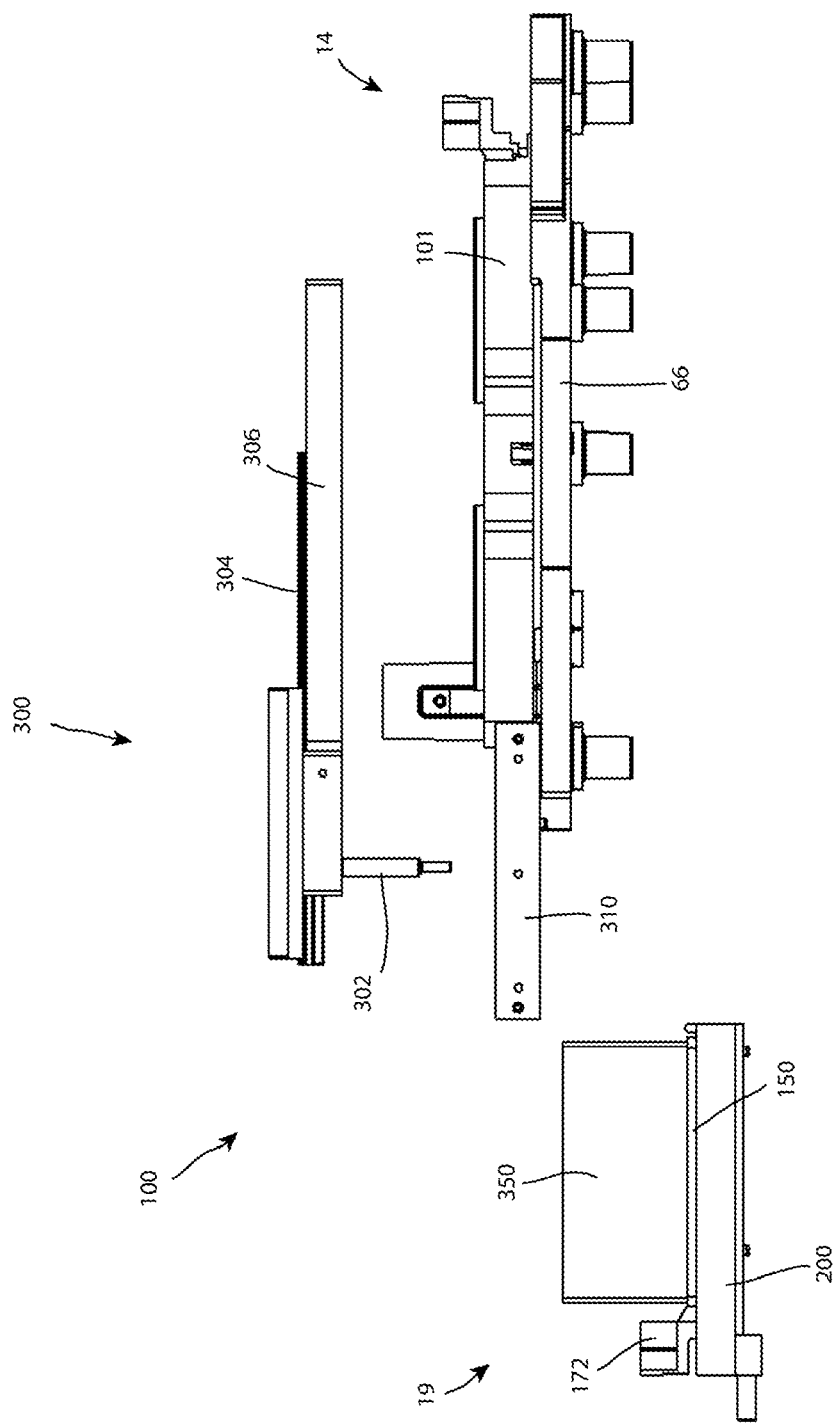
FIG. 12 depicts a side view of the transfer mechanism of FIG. 11 with the transfer mechanism moved back toward the sample manager and remaining disengaged in accordance with one embodiment.

FIG. 12 depicts a side view of the transfer mechanism 300 of FIG. 11 with the transfer mechanism 309 moved back toward the sample manager 14 and remaining disengaged in accordance with one embodiment. As shown in FIG. 12, the transfer mechanism 300 may remain in a home position when there is no need to move transfer drawers 150 between the sample manager 14 and the sample organizer 19. This home position may be at a location that does not interfere with rotation of the sample tray 101 and movement of the sample organizer shelves 200 when transfer tray(s) 150 and sample plates 350 are disposed thereon.

While the description herein above refers to a transfer of a transfer drawer 150 from the sample tray 101 of the sample manager 14 to the sample organizer shelf 200 of the sample organizer 19, the same steps may be repeated in reverse order in order to transfer the transfer drawer 150 in the opposite direction from the sample organizer shelf 200 of the sample organizer 19 to the sample tray 101 of the sample manager 14 when a sample is needed for processing by the sample manager 14. This transferring system may be automated. Once a transfer drawer 150 has been transferred from the sample organizer 19 to the sample tray 101, the sample tray 101 may be rotated 90 degrees or 180 degrees clockwise in order to move the transfer drawer 150 into a sample processing position whereby the sample manager may be configured to inject samples 352 held on the sample plate 350 held by the transfer drawer 150 into a chromatographic flow stream as shown in FIG. 1.

Figure 13:
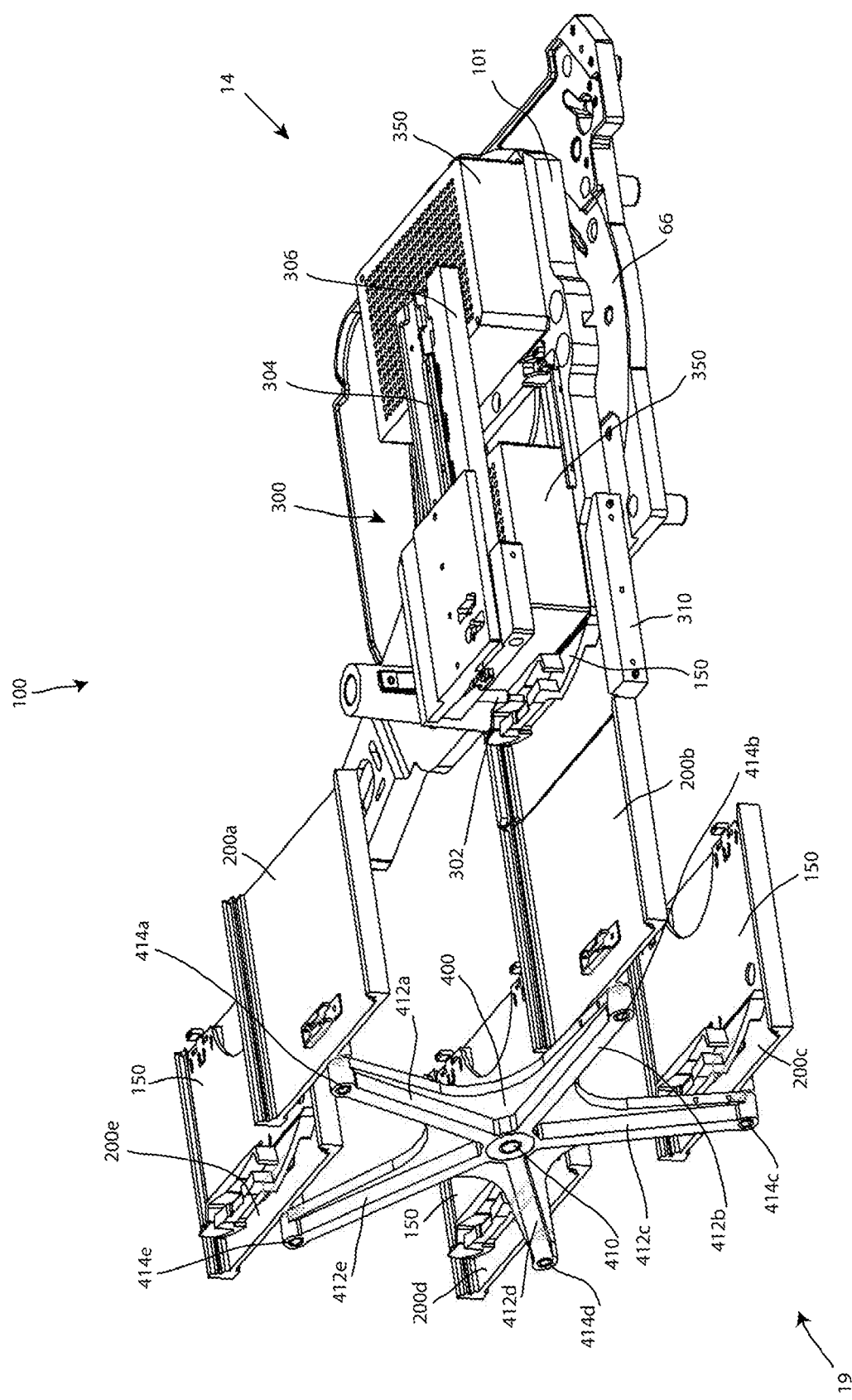
FIG. 13 depicts a perspective view of the transfer system of FIGS. 5-9 in a first position in accordance with one embodiment.

Referring to FIG. 13, a perspective view of the transfer system 100 is shown in a first position in accordance with one embodiment. This first position corresponds to the position shown in FIGS. 8 and 9, prior to movement of the transfer drawer 150 and sample plate 350 from the sample tray 101 across the transfer track 310 and to the sample organizer shelf 200. The sample manager 14 may include a thermal chamber housing the instrument base 66 and the sample tray 101. The thermal chamber of the sample manager 14 may include an opening to the thermal chamber of the sample organizer 19. The transfer track 310 may extend through this opening. The transfer mechanism 300 may mountably attached within either or both of the thermal chamber of the sample manager 14 or the thermal chamber of the sample organizer 19. Where the transfer mechanism 300 is attached, the track 304 may allow for the transfer mechanism body 306 to extend into both of the thermal chamber of the sample manager 14 and the thermal chamber of the sample organizer 19 to exact transfer of the transfer drawer 150 and the sample plate 350 there between.

Figure 14:
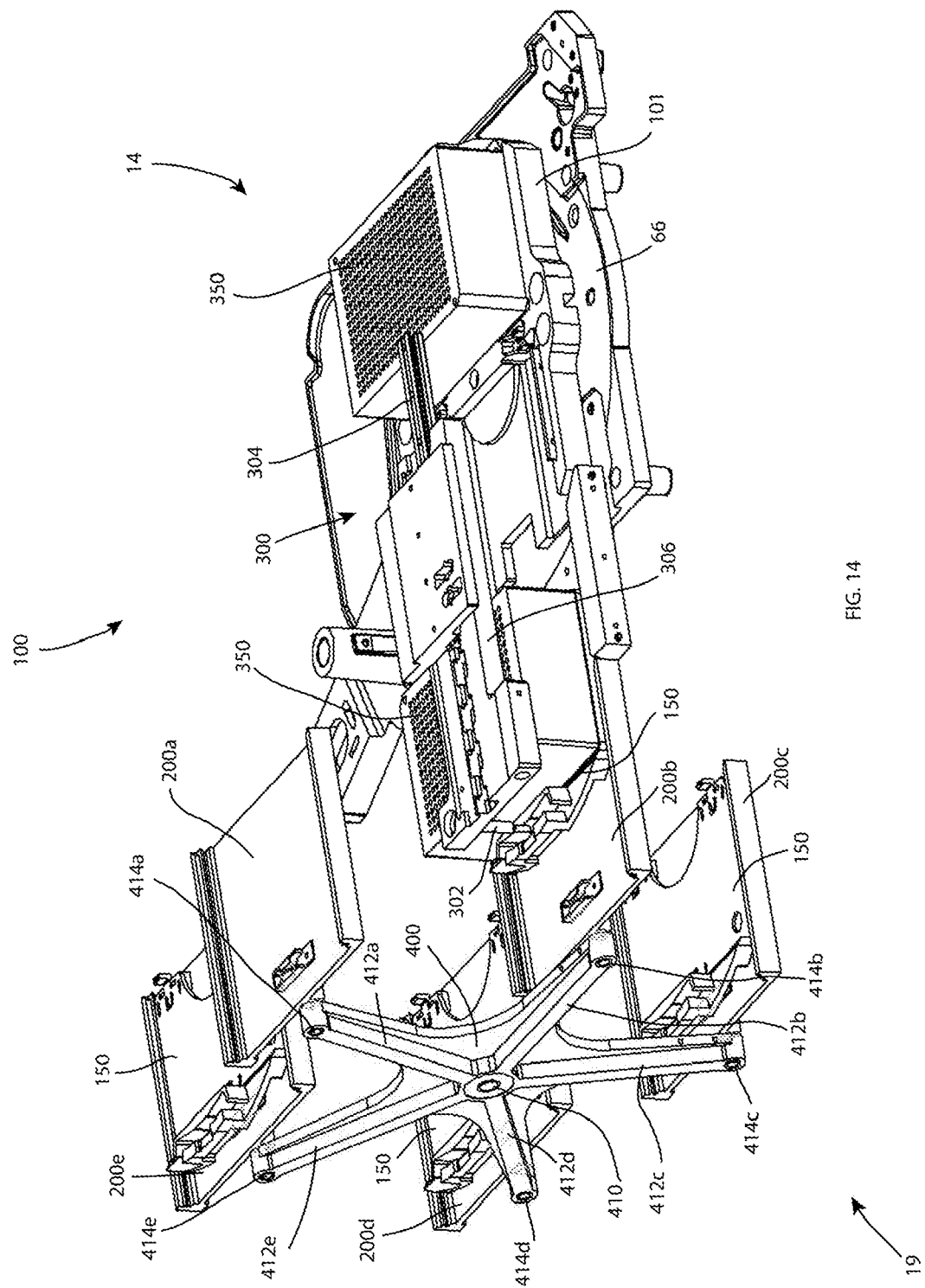
FIG. 14 depicts a perspective view of the transfer system of FIGS. 5-9 in a second position in accordance with one embodiment.

In the embodiment shown, the thermal chamber of the sample organizer 19 includes a rotary shelf system 400. The rotary shelf system 400 includes a rotating axis 410 that is horizontally oriented such that the rotary shelf system 400 rotates in a vertical fashion in a similar manner to a Ferris wheel. The rotary shelf system 400 is shown including five arms 412a, 412b, 412c, 412d, 412e extending from the rotating axis 410 in the shape of a star. While the five arms 412a, 412b, 412c, 412d, 412e are shown, other contemplated embodiments include more or less than five separate arms. Disposed at the end of each of the arms 412a, 412b, 412c, 412d, 412e is another rotating axis 414a, 414b, 414c, 414d, 414e. The rotating axis 414a, 414b, 414c, 414d, 414e provide for rotation of five sample organizer shelves 200a, 200b, 200c, 200d, 200e, respectively. The sample organizer shelves 200a, 200b, 200c, 200d, 200e may thus maintain their upright position as the rotary shelf system 400 rotates about the rotating axis 410. In practice, the rotary shelf system 400 may rotate to bring one of the sample organizer shelves 200a, 200b, 200c, 200d, 200e in a position to receive the transfer drawer 150 and the sample plate 350. Once the sample organizer shelf 200b is in position, the transfer mechanism 300 may begin the transfer process for receiving the transfer drawer 150 and the sample plate 350, as shown. FIG. 14 depicts a perspective view of the transfer system 100 in a second position in accordance with one embodiment. This second position corresponds to a position just prior to the position shown in FIG. 10, as the transfer drawer 150 and sample plate 350 cross the transfer track 310.

Rather than including a rotary sample organizer as shown in FIGS. 13 and 14, the sample organizer may instead include a Z drive, a Y shuttle and an X shuttle each located within a thermal chamber of the sample organizer. The Z drive may act as an elevator within the sample organizer 19 and moves the Y shuttle up and down along the shelves. Once in position in the vertical axis (Z) direction, the Y shuttle is then configured to remove samples from the respective shelves from the front of the sample organizer 19 to the back toward the Z drive. Once a sample has been received, the Z drive again moves vertically in the sample organizer to a delivery location for delivering the sample to the sample manager 14. Once at the delivery location, the X shuttle moves the sample from the sample organizer 19 through an opening or door and into a thermal chamber of the sample manager 14 for processing. The sample manager 14 may thus be configured to inject a sample from a sample vail carrier received from the sample organizer 19 into a chromatographic flow stream.

Methods of transferring samples in a liquid chromatography system are also contemplated. Methods may include providing a sample organizer, such as the sample organizer 19, having a first thermal chamber, such as the thermal chamber, and a sample organizer shelf, such as one of the sample organizer shelves 200, mounted within the first thermal chamber, the sample shelf including a shelf magnet, such as the shelf magnet 206. Methods may include providing a sample manager, such as the sample manager 14, having a second thermal chamber, such as the thermal chamber, the sample manager having a sample tray mounted within the second thermal chamber, such as the sample tray 101. Methods may include providing a transfer drawer, such as the transfer drawer 150, including a support surface, such as the support or planar surface 152, and a first transfer drawer magnet, such as the front magnet 170. Methods may include storing a plurality of sample vial carriers, such as the sample plates 350, in the sample organizer. Methods may include supporting a first sample-vial carrier of the plurality of sample vial carriers on the support surface of the transfer drawer, the first sample-vial carrier including a first sample, such as one of the samples 352. Methods may include removably coupling the transfer drawer to the sample tray of the sample manager and injecting, with the sample manager, the liquid chromatography sample into a chromatographic flow stream. Methods may include transferring the transfer drawer from the sample tray to the sample organizer shelf, and removably coupling, after the transferring, the transfer drawer to the sample organizer shelf such that attraction between the first transfer drawer magnet and the shelf magnet retain the transfer drawer in a first removably coupled position with respect to the sample organizer shelf.

In accordance with methods described herein, the transfer drawer may include a first edge and a second edge, wherein the transfer drawer includes a first tongue, such as the side tongue 166a, extending along the first edge of the transfer drawer and a second tongue, such as the side tongue 166b, extending along the second edge of the transfer drawer, wherein the sample organizer shelf includes a compartment sized to closely receive the transfer drawer, such as the planar support surface 202. The compartment includes a first groove on a first side of the compartment, such as the groove 204, and a second groove on a second side of the compartment such as the groove 204. The removably coupling the transfer drawer to the sample organizer shelf may further include slidably receiving the first tongue with the first groove and slidably receiving the second tongue with the second groove.

Methods may further include providing a transfer track such as the transfer track 310, attached to the sample tray, and facilitating transfer of the transfer drawer between the sample organizer shelf and the sample tray of the sample manager with the transfer track. Methods may further include providing a plurality of sample organizer shelves, such as the shelves 200, mounted within the first thermal chamber, moving the plurality of the sample organizer shelves, and selectively aligning one of the plurality of sample organizer shelves with the transfer track. In accordance with methods described herein, the transfer track may include a first groove, such as the first groove 314, on a first side, such as the first side 316, and a second groove, such as the second groove 318, on a second side, such as the second side 320, of the transfer track. The facilitating transfer of the transfer drawer between the sample organizer shelf and the sample tray of the sample manager with the transfer track may further include slidably receiving the first tongue within the first groove, and slidably receiving the second tongue within the second groove.

In accordance with methods described herein, the transfer drawer may includes a second transfer drawer magnet, such as one or both of the rear magnets 168a, 168b, and the sample tray includes a sample tray magnet, such as one or both of the first and second tray magnets 132a, 132b. The removable coupling the transfer drawer to the sample tray of the sample manager is facilitated by the magnetic attraction between the second transfer drawer magnet and the sample tray magnet.

In accordance with methods described herein, the transfer drawer may include a top side and a bottom side, where the first and second transfer drawer magnets are on the bottom side. The first transfer drawer magnet may be located proximate a first side of the transfer drawer and the second transfer drawer magnet may be located proximate a second side of the transfer drawer, the second side opposite the first side.

Methods may further include providing a transfer mechanism, such as the transfer mechanism 300, including a pin such as the pin 302. The transferring the transfer drawer from the sample tray to the sample organizer shelf may further include engaging the transfer drawer with the pin. Methods may include moving the sample organizer shelf away from the pin within the first thermal chamber of the sample organizer, and disengaging the transfer drawer from the pin from the transfer drawer with the moving. The transfer drawer may include a pin slot, such as the pin slot 172. The transferring the transfer drawer from the sample tray to the sample organizer shelf may include receiving and coupling the pin of the transfer mechanism to the transfer drawer.

While the invention has been shown and described with reference to specific embodiments, it should be understood by those skilled in the art that various changes in form and detail may be made therein without departing from the spirit and scope of the invention as recited in the accompanying claims.

What is claimed is:

1. A liquid chromatography system comprising:
   a sample organizer configured to store a plurality of sample-vial carriers each holding a sample, the sample organizer having a first chamber and a sample organizer shelf mounted within the first chamber, wherein a shelf magnet is affixed to a surface of the sample organizer shelf;
   a sample manager configured to inject a first sample from a first sample vial carrier of the plurality of sample-vial carriers into a chromatographic flow stream, the sample manager having a second chamber, the sample manager having a sample tray mounted within the second chamber; and
   a transfer drawer including a support surface configured to support the first sample-vial carrier, the transfer drawer including a first transfer drawer magnet, the transfer drawer configured to be removably coupled to the sample tray of the sample manager, the transfer drawer configured to be removably coupled to the sample organizer shelf such that attraction between the first transfer drawer magnet and the shelf magnet retain the transfer drawer in a first removably coupled position with respect to the sample organizer shelf, the transfer drawer configured to be transferred between the sample organizer shelf and the sample tray of the sample manager.

2. The liquid chromatography system of claim 1, wherein the transfer drawer includes a first edge and a second edge, wherein the transfer drawer includes a first tongue extending along the first edge of the transfer drawer and a second tongue extending along the second edge of the transfer drawer.

3. The liquid chromatography system of claim 2, wherein the sample organizer shelf includes a compartment sized to closely receive the transfer drawer, and wherein the compartment includes a first groove on a first side of the compartment configured to slidably receive the first tongue, and a second groove on a second side of the compartment configured to slidably receive the second tongue.

4. The liquid chromatography system of claim 3, further comprising a transfer track operably coupled to the sample manager and configured to facilitate transfer of the transfer drawer between the sample organizer shelf and the sample tray of the sample manager.

5. The liquid chromatography system of claim 4, wherein the sample organizer includes a plurality of sample organizer shelves mounted within the first chamber, wherein the plurality of sample organizer shelves are movable to selectively align the plurality of sample organizer shelves with the transfer track.

6. The liquid chromatography system of claim 4, wherein the transfer track includes a first groove on a first side of the transfer track configured to slidably receive the first tongue, wherein the transfer track includes a second groove on a second side of the transfer track configured to slidably receive the second tongue.

7. The liquid chromatography system of claim 1, wherein the transfer drawer includes a second transfer drawer magnet and wherein the sample tray includes a sample tray magnet, wherein attraction between the second transfer drawer magnet and the sample tray magnet retain the transfer drawer in a second removably coupled position with respect to the sample tray.

8. The liquid chromatography system of claim 7, wherein the transfer drawer includes a top side and a bottom side, wherein the first and second transfer drawer magnets are on the bottom side.

9. The liquid chromatography system of claim 8, wherein the first transfer drawer magnet is located proximate a first side of the transfer drawer and wherein the second transfer drawer magnet is located proximate a second side of the transfer drawer, the second side opposite the first side.

10. The liquid chromatography system of claim 1, further comprising a transfer mechanism including a pin configured to engage the transfer drawer during the transferring of the transfer drawer between the sample tray and the sample organizer shelf.

11. The liquid chromatography system of claim 10, wherein the sample organizer shelf is configured to move away from the pin within the first chamber of the sample organizer in order to disengage from the pin from the transfer drawer after the transferring.

12. The liquid chromatography system of claim 10, wherein the transfer drawer includes a pin slot configured to receive the pin and couple the transfer mechanism to the transfer drawer during the transferring of the transfer drawer between the sample tray and the sample organizer shelf.

13. A liquid chromatography sample organizer comprising:
   a first chamber;
   a plurality of stacked sample organizer shelves mounted within the first chamber, the plurality of stacked sample organizer shelves each individually configured to store a sample-vial carrier including a sample; and
   a shelf magnet affixed to a surface of each of the plurality of stacked sample organizer shelves,
   wherein a portion of the first chamber is configured to be located adjacent to, and open to, a sample manager configured to inject liquid chromatography samples into a chromatographic flow stream.

14. The liquid chromatography sample organizer of claim 13, further comprising a transfer drawer including a support surface configured to support the sample-vial carrier, the transfer drawer including a first transfer drawer magnet, the transfer drawer configured to be removably coupled to the sample organizer shelf such that attraction between the first transfer drawer magnet and the shelf magnet retain the transfer drawer in a first removably coupled position with respect to the sample organizer shelf, the transfer drawer configured to be transferred between the sample organizer shelf and the sample tray of the sample manager.

15. The liquid chromatography sample organizer of claim 14, wherein the transfer drawer includes a top side and a bottom side, wherein the first transfer drawer magnet is on the bottom side.

16. The liquid chromatography sample organizer of claim 14, further comprising a transfer mechanism including a pin configured to engage the transfer drawer during the transferring of the transfer drawer between the sample manager and a selected one of the plurality of stacked sample organizer shelves.

17. The liquid chromatography sample organizer of claim 16, wherein the sample organizer shelf is configured to move away from the pin within the first chamber of the sample organizer in order to disengage from the pin from the transfer drawer after the transferring.

18. The liquid chromatography sample organizer of claim 16, wherein the transfer drawer includes a pin slot configured to receive the pin and couple the transfer mechanism to the transfer drawer during the transferring of the transfer drawer between the sample manager and the selected one of the plurality of stacked sample organizer shelves.

19. The liquid chromatography sample organizer of claim 14, wherein the transfer drawer includes a first edge and a second edge, wherein the transfer drawer includes a first tongue extending along the first edge of the transfer drawer and a second tongue extending along the second edge of the transfer drawer.

20. The liquid chromatography sample organizer of claim 19, wherein each of the plurality of stacked sample organizer shelves includes a compartment sized to closely receive the transfer drawer, and wherein the compartment includes a first groove on a first side of the compartment configured to slidably receive the first tongue, and a second groove on a second side of the compartment configured to slidably receive the second tongue.

21. The liquid chromatography sample organizer of claim 13, wherein the plurality of stacked sample organizer shelves are movable to selectively align a selected shelf of the plurality of stacked sample organizer shelves with a transfer mechanism of the sample manager.

22. A transfer drawer for use in a liquid chromatography system, comprising:
   a support surface configured to support a sample-vial carrier;
   a first transfer drawer magnet; and
   a second transfer drawer magnet,
   wherein the transfer drawer is configured to be removably coupled to a sample organizer shelf such that the first transfer drawer magnet is configured to retain the transfer drawer in a first removably coupled position with respect to the sample organizer shelf, the transfer drawer configured to be transferred between the sample organizer shelf and a sample tray of a sample manager, and
   wherein the transfer drawer is configured to be removably coupled to the sample tray of the sample manager such that the second transfer drawer magnet is configured to retain the transfer drawer in a second removably coupled position with respect to the sample tray.

23. The liquid chromatography system of claim 22, wherein the transfer drawer includes a first edge and a second edge, wherein the transfer drawer includes a first tongue extending along the first edge of the transfer drawer and a second tongue extending along the second edge of the transfer drawer.

24. The liquid chromatography system of claim 23, wherein the support surface includes a compartment defined between the first edge and the second edge configured to securably receive the sample-vial carrier.

25. The liquid chromatography system of claim 22, wherein the transfer drawer includes a top side and a bottom side, wherein the first and second transfer drawer magnets are on the bottom side.

26. The liquid chromatography system of claim 22, wherein the first transfer drawer magnet is located proximate a first side of the transfer drawer and wherein the second transfer drawer magnet is located proximate a second side of the transfer drawer, the second side opposite the first side.

27. The liquid chromatography system of claim 22, wherein the transfer drawer includes a pin slot configured to receive a pin of a transfer mechanism, the pin and the transfer mechanism configured to transfer the transfer drawer between the sample organizer shelf and a sample tray of a sample manager.

28. A method of transferring samples in a liquid chromatography system comprising:
   providing a sample organizer having a first chamber and a sample organizer shelf mounted within the first chamber, the sample shelf including a shelf magnet;
   providing a sample manager having a second chamber, the sample manager having a sample tray mounted within the second chamber;
   providing a transfer drawer including a support surface and a first transfer drawer magnet;
   storing a plurality of sample vial carriers in the sample organizer;
   supporting a first sample-vial carrier of the plurality of sample vial carriers on the support surface of the transfer drawer, the first sample-vial carrier including a first sample;
   removably coupling the transfer drawer to the sample tray of the sample manager;
   injecting, with the sample manager, the liquid chromatography sample into a chromatographic flow stream;
   transferring the transfer drawer from the sample tray to the sample organizer shelf; and
   removably coupling, after the transferring, the transfer drawer to the sample organizer shelf such that attraction between the first transfer drawer magnet and the shelf magnet retain the transfer drawer in a first removably coupled position with respect to the sample organizer shelf.

* * * * *